United States Patent [19]

Lundberg et al.

[11] Patent Number: 5,412,468
[45] Date of Patent: May 2, 1995

[54] GROUPING OF SPECTRAL BANDS FOR DATA ACQUISITION IN A SPECTROPHOTOMETER

[75] Inventors: Peter L. Lundberg, Easton; Michael I. Crockett, Newtown; David H. Tracy, Norwalk, all of Conn.

[73] Assignee: The Perkin-Elmer Corporation, Norwalk, Conn.

[21] Appl. No.: 28,515

[22] Filed: Mar. 9, 1993

[51] Int. Cl.$^6$ ................................................ G01J 3/32
[52] U.S. Cl. ...................................... 356/326; 356/306
[58] Field of Search ............... 356/326, 327, 328, 329, 356/330, 307, 306

[56] References Cited

U.S. PATENT DOCUMENTS

| | | | |
|---|---|---|---|
| 4,158,505 | 6/1979 | Mathisen et al. | 356/308 |
| 4,300,833 | 11/1981 | Harnly et al. | 356/312 |
| 4,636,074 | 1/1987 | Levy et al. | 356/328 |
| 4,820,048 | 11/1987 | Barnard | 356/328 |
| 4,940,325 | 3/1989 | Becker-Ross et al. | 356/328 |
| 5,002,390 | 3/1991 | Gerlacher et al. | 356/328 |
| 5,087,123 | 2/1992 | Gerlacher et al. | 356/328 |
| 5,088,823 | 2/1992 | Smith, Jr. et al. | 356/328 |

Primary Examiner—Robert P. Limanek
Assistant Examiner—David B. Hardy
Attorney, Agent, or Firm—Edwin T. Grimes

[57] ABSTRACT

Spectral bands are grouped for data acquisition in a spectrophotometer with a charge-coupled detector having a plurality of pixels. Preliminary data is generated on time-integrated radiation to the pixels for a sample. Maximum permitted exposure times for the pixels are calculated from the data and a predetermined maximum exposure. The maximum times are grouped so that for each group the ratio of the highest to the lowest maximum times is less than 100. A group run time is established for each group nominally less than the lowest maximum time in the group. Subgroups are created and ordered so that accumulated readout times for the pixels are less than wait times established to prevent readout contamination from subsequent charge buildup. The spectrophotometer is further operated on the sample for the run time of each group and subgroup to generate spectral data.

44 Claims, 5 Drawing Sheets

GROUPING OF SPECTRAL BANDS FOR DATA ACQUISITION IN A SPECTROPHOTOMETER

This invention relates to spectrophotometers, and particularly to means and apparatus for organizing spectral bands for data acqusion in a spectrophotometer.

BACKGROUND OF THE INVENTION

Various types of optical spectrometers are in use for such purposes as atomic emission spectroscopy, atomic absorption spectroscopy and astronomy. A complete system generally consists of a source of radiation, a spectrometer for separating and detecting individual spectral components, and a data station for processing the information from the spectrometer. The radiation source, for example, may be a system for injecting a test sample into an inductively coupled plasma where the atomic species in the sample are excited to radiate characteristic atomic emission. As another example, a sample is evaporated in a graphite furnance where the gaseous sample absorbs certain frequencies of the incident radiation to provide atomic absorption lines. Similarly, astronomical sources provide atomic emission and absorption lines for spectrographic analysis.

Spectrometers generally are based on dispersion of radiation by diffraction gratings, prisms and combinations of the two. Electronic detection devices are taking over from photographic film for accurate and timely measurements of the emission or absorption lines.

There are several types of detectors used for reading the spectrum. The conventional type has been one or more photomultiplier tubes or devices which receive directed radiation to produce free electrons which are multiplied in number to provide a real-time signal output proportional to the radiation intensity. A newer type is based on the principles of charge generation upon the incidence of radiation on a surface such as silicon. To provide resolution of spectral lines (or, more broadly, image resolution) such a surface on a semi-conductor chip is divided into pixel areas. The accumulation and handling of signals from the pixels is effected through the transfer of charges in the chip from the pixels. One type is a charge coupled device (CCD). A related approach for such detectors is charge injection device (CID) technology.

A particular form of solid state detector is disclosed in Barnard U.S. Pat. No. 4,820,048 of the present assignee, and Becker-Ross et al U.S. Pat. No. 4,940,325. A solid state chip has on the front surface thereof a two dimensional array of photosensitive pixel sensors receptive of radiation of selected spectral lines and proximate background radiation. The pixels are arranged in a plurality of subarrays with each subarray consisting of at least one of the pixels. The subarrays are positioned at a projection location on the front surface of at least one of the selected spectral lines. Electronic components formed on the chip among the subarrays are operatively connected to the pixels for producing readout signals correlating with intensities of the spectral lines.

Photomultiplier tubes have quite a wide dynamic range, i.e. the practical range of radiation intensity over which detection may be effected. Solid state sensors do not have such a range, typically having a maximum range of about four orders of magnitude. Also solid state sensors have finite readout times which may may result in contamination by spillover by subsequent radiation-induced electrons, particularly from very intense radiation on the pixels.

An object of the field of the present invention is to provide a novel means and apparatus for extending the effective dynamic range of a multiple-sensor detector in a spectrophotometer. Another object is to provide for improved organization of data runs into several groups in spectrophotometer operation with such a detector, so as to achieve simultaneous data acquisition within the groups. A further object is to provide for improved operational efficiency of a spectrophotometer operation with such a detector, and with improved signal-to-noise efficiency. Yet another object is to provide for spectrophotometer operation with such a detector without sensor readout contamination.

SUMMARY OF THE INVENTION

The present invention includes a method of grouping spectral bands for data acquisition in a spectrophotometer that includes a detector with a plurality of zoned sensors receptive of time-integrated radiation representative of spectral intensities in selected spectral bands associated with corresponding sensors. A maximum permitted amount of time-integrated radiation is predetermined for each corresponding sensor. The spectrophotometer is initially operated on a selected radiation source for a predetermined initial time sufficient for the sensors to collect time-integrated radiation so as to generate preliminary data representative of time-integrated radiation for all of the selected bands. From the preliminary data, maximum exposure times are established for corresponding sensors, so that each maximum exposure time effects the maximum permitted amount of time-integrated radiation for each corresponding sensor. The maximum exposure times for the sensors are grouped into at least one group, each group including a highest maximum exposure time and a lowest maximum exposure time, so that the ratio of the highest to the lowest is equal to or less than a predetermined range factor. A group run time is established for each group equal to or nominally less than the lowest maximum exposure time in the group. The spectrophotometer is further operated on a radiation source substantially the same as the selected radiation source, by operating on each group for the group run time to generate functional data representative of spectral intensities for associated spectral bands.

Each sensor advantageously is operable by storage of radiation-induced charges during the group run time, and by subsequent readout of the charges during a readout time characteristic of the sensor. Storage of further such charges occurs during the readout time such that spillover of the further charges may occur after a spillover time characteristic of the sensor. In such case the method should comprise additional steps for the selected spectral bands in a selected group, prior to the step of further operating. From the preliminary data, a wait time is established for corresponding sensors, so that an exposure from the selected source for each wait time effects a predetermined level of the time-integrated radiation that is less than the spillover level. Selected spectral bands of the group are ordered into at least one subgroup such that each successive spectral band in each subgroup has an accumulated readout time from all preceding spectral bands in the subgroup, the accumulated readout time being less than the wait time for the spectral band. The step of further operating comprises operating the spectrometer for each subgroup so as to expose associated sensors for the group run time and, while continuing such exposure, to read out the associated sensors sequentially according to the ordering of the spectral bands in the subgroup.

The invention also includes a spectrometric apparatus comprising a spectral dispersion system receptive of radiation for effecting spectral bands therefrom, a detector with a plurality of zoned sensors receptive of time-integrated radiation representative of spectral intensities in selected spectral bands associated with corresponding sensors, and a data station receptive of signal data from the detector representative of the time-integrated radiation. The data station includes program means for grouping the selected spectral bands for data acquisition. The program means includes stored predetermined maximum amounts of the time-integrated radiation permitted for corresponding sensors. The apparatus further comprises means for initially operating the spectrophotometer for a predetermined initial time sufficient for the sensors to collect time-integrated radiation so as to generate preliminary data representative of time-integrated radiation for all of the selected bands.

The program means comprises means for establishing, from the preliminary data, maximum exposure times permitted for corresponding sensors, so that each maximum exposure time effects the maximum amount of time-integrated radiation for the corresponding sensor. The program means further comprises means for grouping the maximum exposures for the sensors into at least one group, each group including a highest maximum exposure time and a lowest maximum exposure time, wherein the ratio of the highest to the lowest is equal to or less than a predetermined range factor, and means for establishing a group run time for each group equal to or nominally less than the lowest maximum exposure time in the group. The apparatus further comprises means for further operating the spectrophotometer on each group for the group run time to generate functional data representative of spectral intensities for associated spectral bands.

In the apparatus each sensor advantageously is operable by storage of radiation-induced charges during the group run time, and by subsequent readout of the charges during a readout time characteristic of the sensor. Storage of further such charges occurs during the readout time such that spillover of the further charges occurs after a spillover time characteristic of the sensor. The program means comprises, prior to further operating, and for the selected spectral bands in a selected group, means for establishing wait times for corresponding sensors from the preliminary data, so that an exposure from the selected source for each wait time effects a predetermined level of the time-integrated radiation that is less than the spillover level. The program means further comprises means for ordering the selected spectral bands of the group into at least one subgroup such that each successive spectral band in each subgroup has an accumulated readout time from all preceding spectral bands in the subgroup, the accumulated readout time being less than the wait time for the spectral band. The means for further operating comprises means for operating the spectrometer for each subgroup so as to expose associated sensors simultaneously for the group run time and, while continuing such exposure, to immediately read out the associated sensors sequentially according to the ordering of the spectral bands in the subgroup, to thereby generate the functional data.

DETAILED DESCRIPTION OF THE INVENTION

Figure 1:
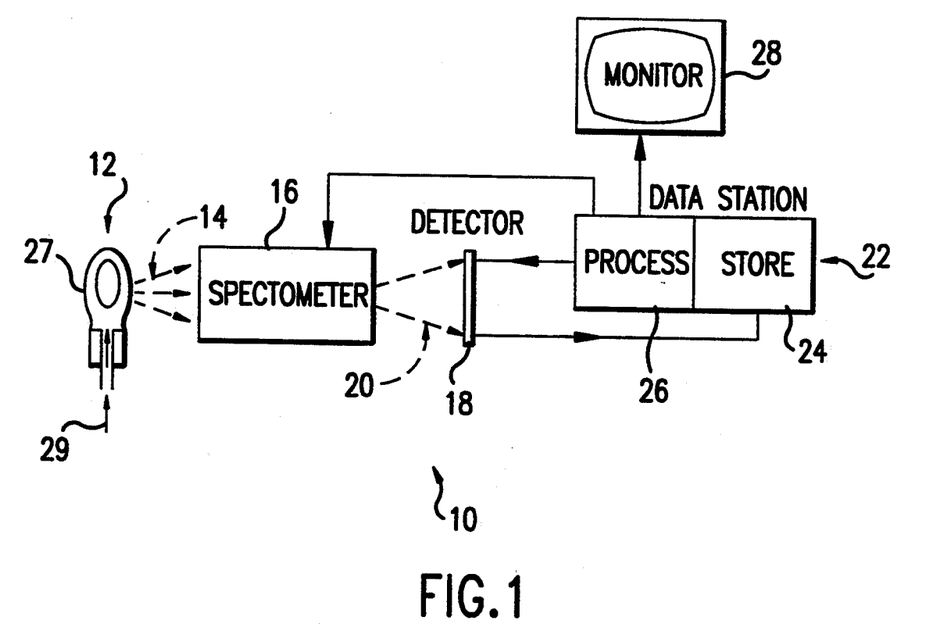
FIG. 1 is a schematic drawing of an apparatus incorporating the invention.

A spectrophotometer system 10 utilized in the present invention is shown schematically in FIG. 1. There are, broadly, four components: a source 12 of radiation 14, an optical spectrometer 16, a detector 18 of spectral bands 20 from the spectrometer, a data station 22 with storage 24 and processing 26 sections, and a monitor 28 and/or printer. The radiation may be in the form of spectral lines emitted, for example, by an induction coupled plasma 27 into which a test sample 29 is injected. The source 12 may alternatively be external such as in astronomy. The spectrometer 16 and detector 18 may generate and detect a spectral dispersion in one or two dimensions. In a useful embodiment, the spectrometer has crossed dispersion elements to produce a two dimensional display of spectral bands or lines, as described in the aforementioned Barnard U.S. Pat. No. 4,820,048 which is incorporated herein by references. (As used herein and in the claims, the term "bands" includes "lines" as a narrow form of spectral bands.)

The detector 18 is a linear or array type with a plurality of zone sensors such as photomultiplier devices located to receive radiation in selected spectral bands. The detector preferably is a solid state chip with a two dimensional array of photosensitive zone sensors (pixels), either continuously or selectively distributed. Each pixel accumulates electrical charges, typically electrons, in response to radiation photons. Although further descriptions below are applied to such a preferred solid state device, it will be appreciated that the invention may be applied to other types of radiation sensors, for example by integrating signals from photomultiplier devices.

In a particularly advantageous aspect (FIG. 2), the detector 18 is a solid state chip with a two dimensional array of photosensitive pixels, or preferably subarrays 30 of pixels, located in substantially less than the full surface area of the chip. The pixels are located selectively at projection locations for selected spectral lines as further disclosed in the Barnard patent. The detector desirably is derived from the type of device generally categorized as a charge transfer device, such as a charge injection device (CID) or preferably a charge coupled device (CCD).

Figure 2:
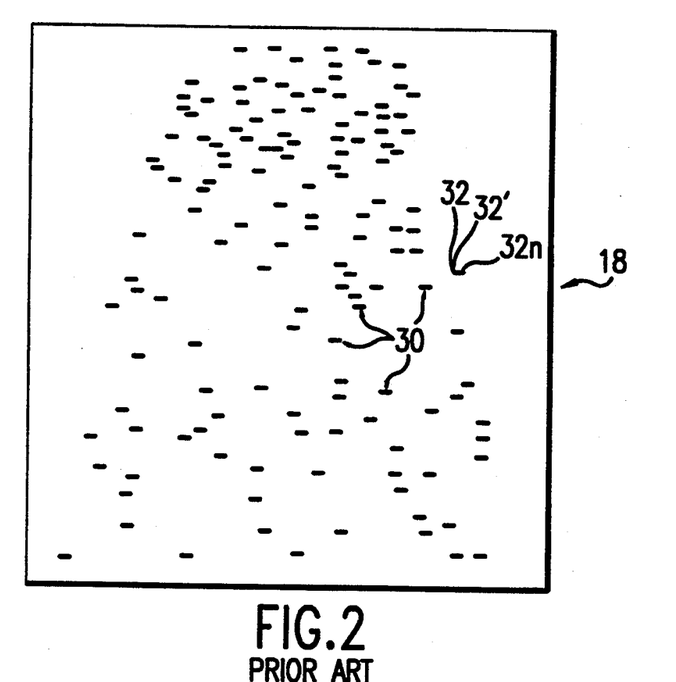
FIG. 2 is a schematic view of the front surface of a detector showing subarrays of pixels, utilized in the invention.

Each sub-array 30 may consist of only one pixel but preferably comprises a plurality of pixels such as 10 to 20 pixels, for example, 16 pixels. Three of the individual pixels on a subarray are designated as $32, 32', 32n$ as indicated in FIG. 2. each pixel is an elongated spot, such as a rectangle having an aspect ratio of about four to one and is, for example, 25 by 100 micrometers. Each pixel is receptive of radiation impinging on it to produce a signal for processing in proportion to the intensity of the radiation.

Generally each sub-array 30 is positioned and dimensioned such that one pixel, or two or three adjacent pixels, will be receptive of the radiation of a corresponding atomic emission spectral line to be analyzed. The other pixels in the same subarray serve two purposes. One, as mentioned above, is to simultaneously detect background radiation close to the spectral line in order to correct for background. The other purpose is to provide a range of available pixel positions for the spectral line so that an exact pre-determination of line position focused by the optics is not necessary.

As explained in the Barnard patent, each pixel sensor receives radiation which causes buildup of electrical charges (generally electrons) in proportion to the intensity and exposure time. Gates, intermediate charge storage registers (wells), circuitry in the chip, and other circuitry associated therewith, selectively or periodically read out the charges from each pixel to generate data representative of time-integrated intensity of the radiation exposure of the associated pixel. "Time-integrated intensity" is the total radiation received during an exposure run; the actual intensity of radiation received by a pixel is this total divided by the run time. The radiation may be continuous, the run time being controlled by chip gate controls and readouts. The data are stored in the memory section 24 of the data station, and then processed in the processor sector 26 to provide spectral and related information such as the quantity of various chemical species in the test sample. Such processing is effected in any conventional or desired manner, except to the extent of the present invention described herein.

As further explained in the Barnard patent, each detector chip may have pixel locations for both visible and ultraviolet (UV) lines. The spectrometer separates the spectra for the two regions. Two detector chips are used in such the instrument, but they are identical one being read out only for visible radiation and the other only for UV. Several levels of area resolution on the chip are possible. For example, in the case of UV, a chip may have each pixel further divided in half electrically so that half of each pixel in a subarray can be read out alternately, effectively doubling the area resolution. In examples set forth below, branch operations are indicated relating to ordinary resolution and high resolution.

The pixel sensors have practical upper and lower limits for the time-integrated radiation exposures. The lower or minimum operational limit is due to detector readant noise, typically about one charge count. The upper limit, designated herein as a saturation limit of time-integrated radiation, is the point at which the charge register for a pixel is filled so as to start spilling over to adjacent registers or pixels. This may occur, for example, at about 60,000 counts. Thus the real dynamic range for a chip is a factor of about 60,000. In a high resolution mode the count limit may be half. An objective of this invention is to provide an extended virtual dynamic range for groups of spectral lines being measured simultaneously. This is achieved with specified operations of the spectrophotometer, groupings of spectral data, and selected run times for the groups. Preferably computor programming is utilized to carry out the operations.

The programming means for carrying out the steps described herein, as outlined by the flow diagrams, is conveniently and readily achieved with a conventional computor system such as "C" generally available through the supplier of the operating system utilized with the computor. The program may be compiled, for example, on a Digital Equipment Corporation DEC-STATION ™ 325C computor associated with the spectrometer.

Figure 3:
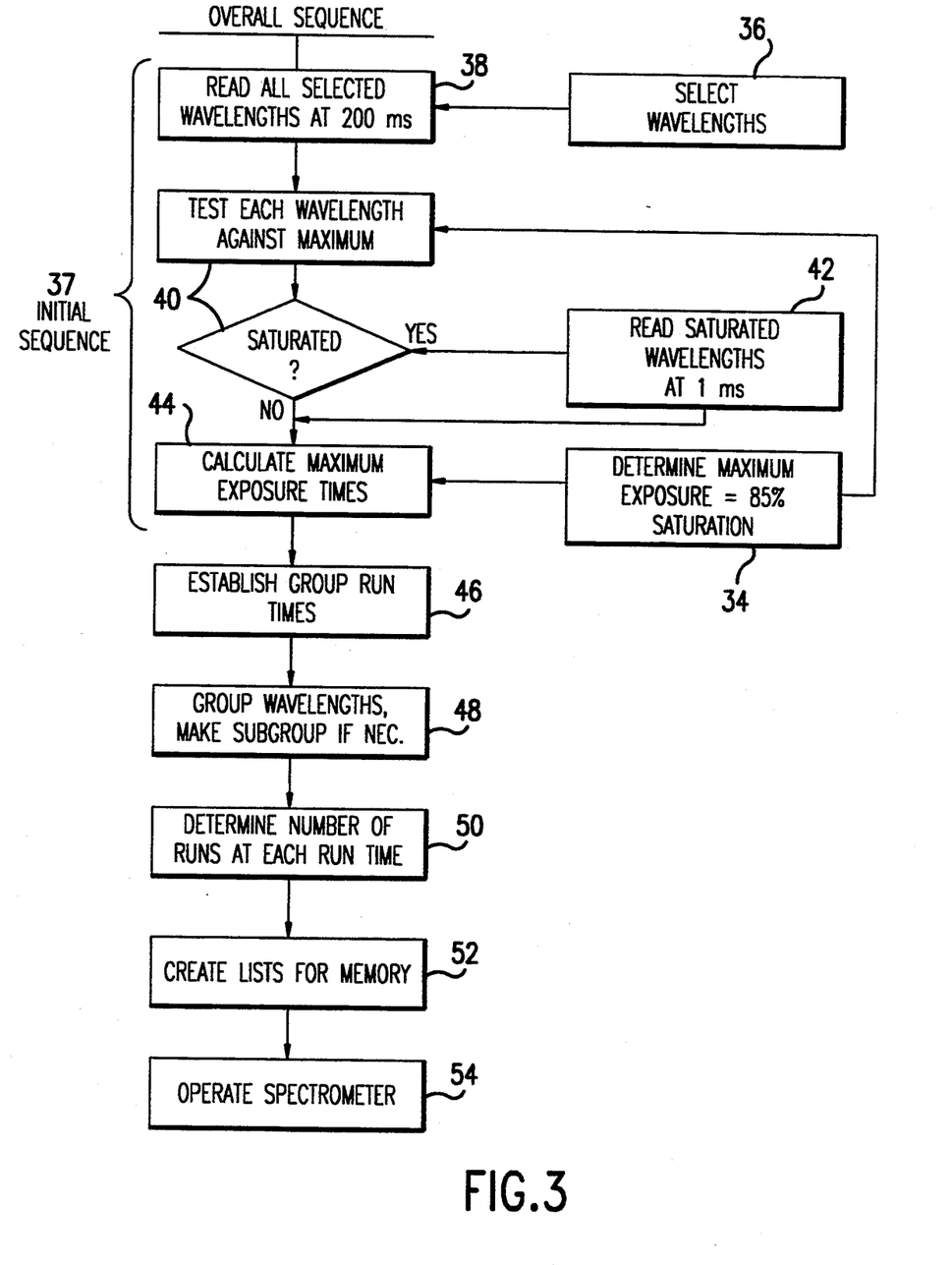
FIGS. 3 through 6 are flow diagrams outlining a method and means for carrying out the invention.

FIG. 3 is a flow diagram for the overall operation. In this and subsequent descriptions specific numerical values are suggested as examples but are not to be construed as limiting. Before starting, maximum allowed exposure for time-integrated radiation is determined 34, preferably at a generally optimal fraction of the saturation limit. This exposure should yield essentially a practical maximum permitted signal-to-noise ratio without risking saturation of any pixels. A suitable choice for the optimal fraction of should be between about 60% and 95%, preferably about 85% of the saturation limit, e.g. 50,000 counts. Such a fraction is intended to be as high as possible while being safely below the limit. Another preliminary step is to select 36 those spectral bands and associated pixels or subarrays that are desired for data aquisition.

In an initial sequence 37, the spectrometer is operated 38 for a predetermined initial time, e.g. 200 ms (milliseconds), sufficient for the detector to collect radiation for the selected bands between the minimum operational limit and the saturation limit, so as to generate preliminary data representative of time-integrated radiation for substantially all of the selected bands. Data for each pixel is tested 40 for possibly exceeding the maximum permitted exposure count (e.g. the 50,000 count limit). If such is exceeded, the initial operation of the spectrometer is repeated 42 for a lessor time, e.g. 1 ms. In either case, a maximum permitted exposure time is calculated 49 for each pixel so as to target the maximum counts. In the case of the pixels being in subarrays, a common time is determined for each subarray using the pixel with peak intensity.

A set of group run times is established 46, the set typically containing only about one to four such times based on the maximum times and certain preset parameters, as detailed below. The pixels (or subarrays thereof, or wave lenghts associated therewith) are grouped 48 so that each group has an assigned group run time. Subgroups may be necessary. The number of repetitive runs is determined 50 for each group based on a pre-established minimum data collection time, and the lists and associated times and run numbers are sent 52 to the processor memory. The spectrometer is then further operated 59 for each group for the group run time to generate functional data representative of time-integrated intensities of the selected bands. The functional data is advantageously obtained simultaneously for the selected wavelength bands associated with each group, and provides the actual run data for the test sample, the data then being processed for the desired information.

Figure 4:
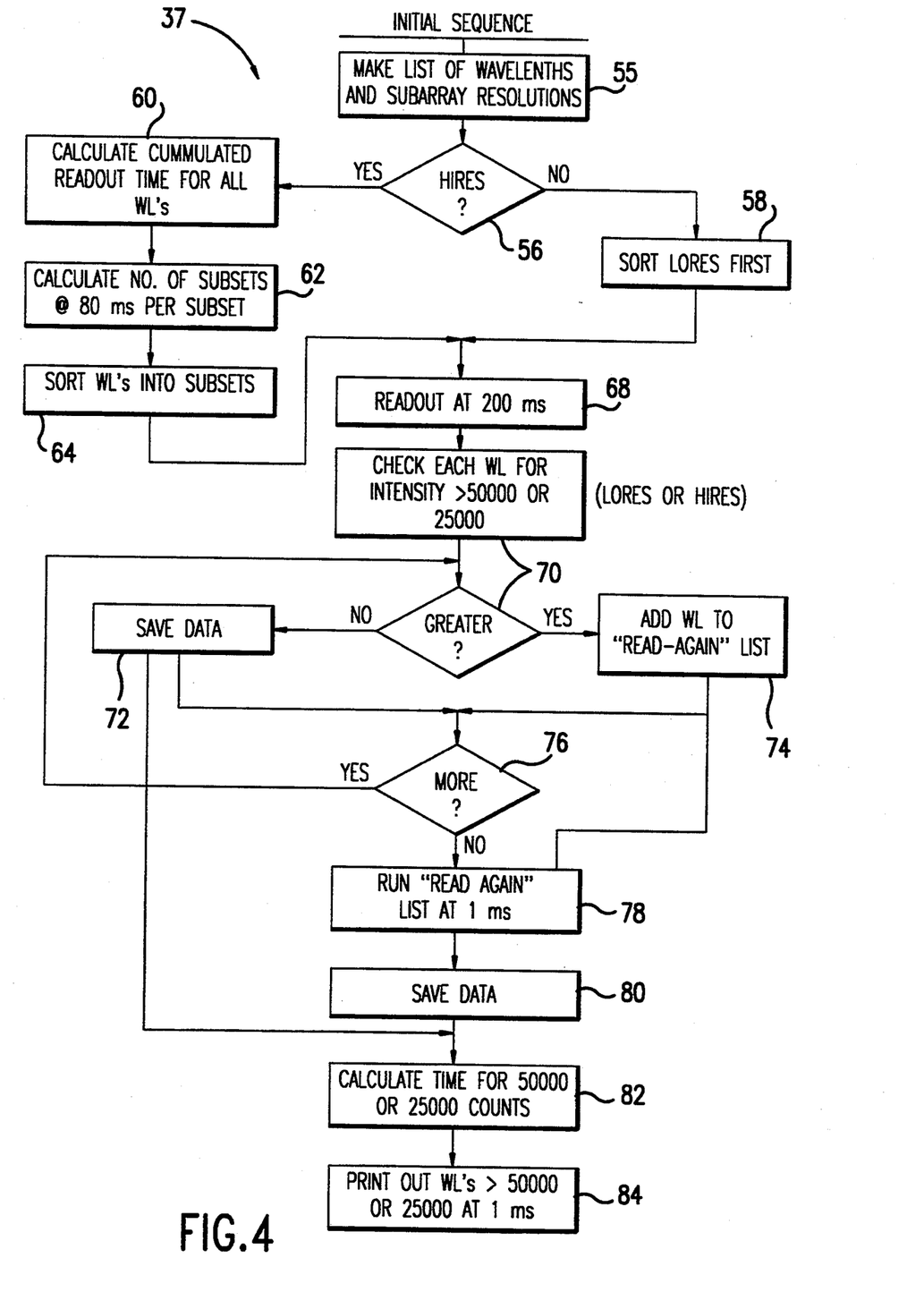

FIG. 4 details an initial sequence 37. A list is formed 55 of selected pixel subarrays and associated resolutions (low or normal resolution "LORES" and high resolution "HIRES"). The list is divided 56 into LORES and HIRES, LORES being sorted first 58. For HIRES, a cumulated readout time is calculated for all selected wavelengths, the number of subsets for 80 ms per set is determined 62, and wavelengths are further sorted 64 into subsets. The spectrophotometer is then operated, and all time-integrated intensity data (run counts in the case of CCD) for all selected wavelengths are read out 68 at 200 ms.

Data for each pixel are checked 70 for exceeding the maximum exposure, i.e. 50,000 counts for LORES and 25,000 counts for HIRES. If the limit is not exceeded, the subarray data (counts for each pixel in the subarray)

are saved 72; if it is exceeded, the subarray is added 74 to a read-again list. The testing is repeated 76 for all selected subarrays. Each subarray in the read-again list is run again 78 by the spectrophotometer at 1 ms, and the time-integrated intensity data (counts) are saved 80. Maximum exposure times for corresponding sensors are established so that each such time effects the maximum allowed amount of time-integrated radiation for the corresponding sensor. The maximum exposure time $T_M$ preferably is calculated 82 for each pixel according to a formula: $T_M = T_i * MA/PD$, where MA is the maximum amount of time-integrated radiation for the sensor (MA=50,000 for LORES and 25,000 for HIRES), $T_i$ is the initial run time of 200 ms or 1 ms, and PD is the preliminary count data for the peak intensity pixel in the subarray. Any subarrays having counts in the 1 ms run which exceed the 50,000 or 25,000 limits are discarded but displayed or printed 89 for the operator to know.

For the next sequence 46, (FIG. 5) several parameters are initially set 86, either permanently, or by the operator each time, or the latter with default values. Data collection time (DCT) is the total time established for a group of selected wavelengths, being the multiplication product of each run time and the number of runs. A minimum data collection time is determined, being as short as possible to minimize run times and repetitions, but large enough to minimize short term source noise and allow satisfactorily low standard deviations for the data. A maximum data collection time is also set, simply based on a practical upper limit for run times and repetitions with an objective to maximize signal-to-noise ratios. As examples, minimum DCT may be from 1 to 200 seconds with a default of one second, and maximum DCT may be from 4 to 200 seconds with a default of 10 seconds.

Figure 5:
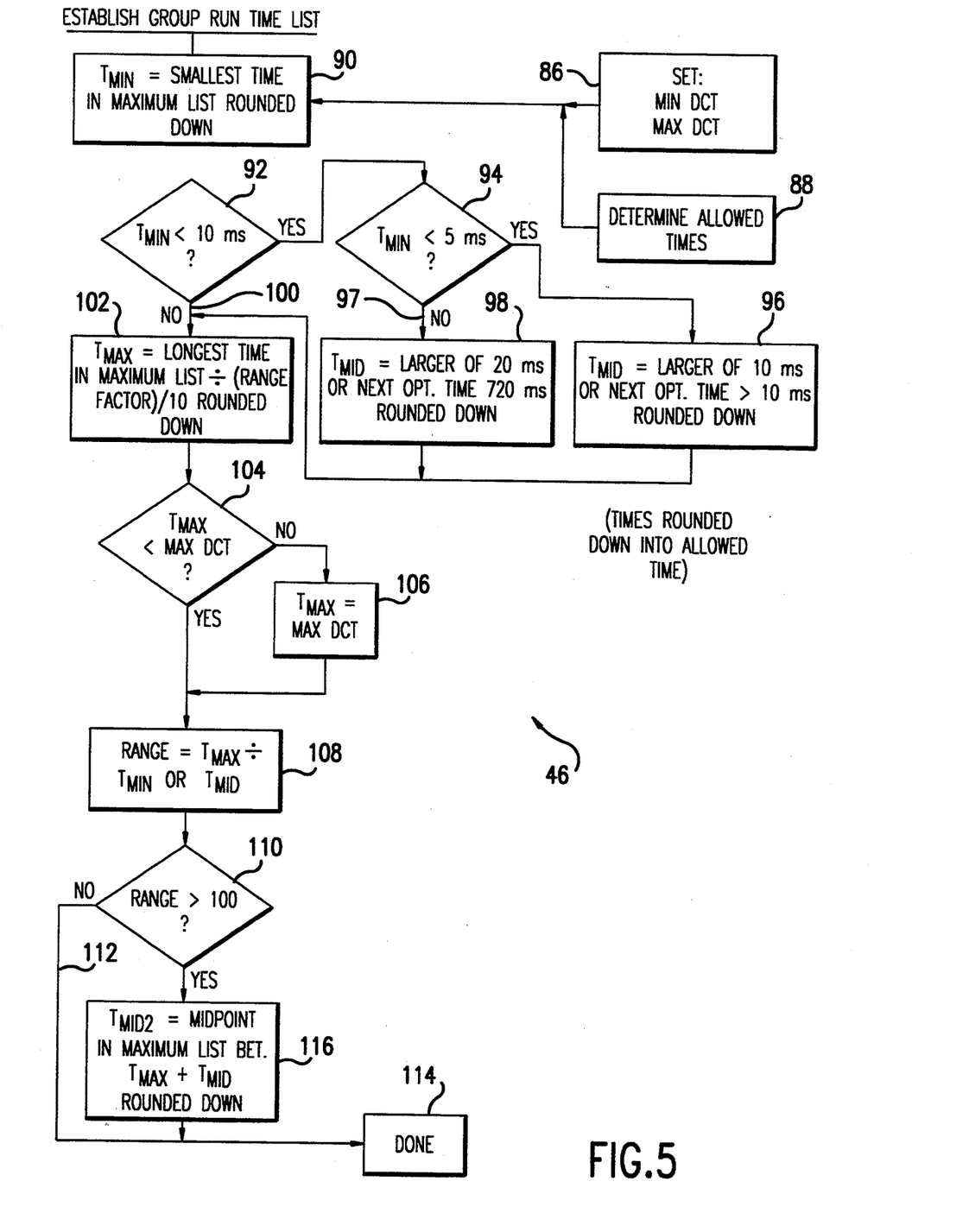

As used herein and in the claims the term "run time" refers to a shuttered exposure of radiation passing to the detector, or to an integration time controlled by gating and electronic readouts from the pixels as in the example of the CCD chip, or the like. To implement a program for establishing run times, it is convenient to install a predetermined list of allowed run times 88. These suitably range from 1 ms to 50,000 ms in intervals of approximately a factor of 2, viz. 1 ms, 2 ms, 5 ms, 10 ms, 20 ms, etc. to 50,000 ms. An "allowed list" is displayed in Table I (column 1) which also shows an example of a set of maximum exposure times (column 2) ("maximum list"). However, it will be appreciated that other means for programmed computations may be used in place of the allowed list. The allowed list provides for standardized run times to be selected that are equal to or nominally less than actual calculations. Advantageously the terms "nominally equal to" or "nominally less than" as used herein and in the claims mean within about a factor of two of the referenced value. Generally a computed value is rounded down into the nearest time in the allowed list.

Groups and group run times are established next (FIG. 5). Each group will have a highest maximum exposure time and a lowest maximum exposure time. The general requirement is that the ratio of the highest to the lowest be less than a range factor such as 100.

Firstly, a minimum group run time $T_{min}$ is determined 90 as the overall lowest maximum time in the maximum list rounded down to the nearest time in the allowed list. In Table I the smallest maximum time is 6 ms, so $T_{min}$ is 5 ms.

If necessary, at least one more group run time is established between a maximum run time (determined below) and the minimum run time such that a ratio of each run time to a next shorter run time is less than the range factor. Also, if $T_{min}$ is shorter than a relatively low value such as 10 ms (92), it is desirable to include middle range exposure time $T_{mid}$ so that the system will not be slowed down by too many exposures at the very short exposure time. In an example of the present flow diagram, if $T_{min}$ is smaller than 5 ms (94), $T_{mid}$ is the next higher integration time in the maximum list larger than 10 ms (96), rounded down into the allowed list. If $T_{min}$ is equal to (i.e. not less than) 5 ms (97) (as in Table I), $T_{mid}$ is the next time in the maximum list larger than 20 ms, (98) rounded down into the allowed list. Thus in Table I, 62 ms is next larger than 20 and is rounded down so $T_{mid}=50$ ms. If $T_{min}$ is not less than 10 ms (100), there is no $T_{mid}$.

A maximum group run time $T_{max}$ is set 102 as the overall highest maximum exposure time in the maximum list divided by a subfactor that is one tenth of a predetermined range factor, the result being rounded up or (preferably) down into the allowed list. The range factor is the maximum multiple of maximum times allowed within each group of selected wavelengths. A range factor of 100 is suitable and used herein, although other values such as 1000 or 10 may be selected. The fraction "one tenth" is suitable for a range factor of 100 but, more generally, another fraction may be selected, for example to effect a logarithmic midpoint of the range factor. In Table I the largest maximum time is 15,000; division by 10 (one tenth of range factor 100) yields 1500 which is rounded down into an allowed $T_{max}=1000$ ms. This value is then tested 104 for whether it is less than the allowed maximum data collection time (MaxDCT); if not, $T_{max}$ is set equal to MaxDCT (106).

A range is next calculated 108 as the ratio of $T_{max}$ to the greater of $T_{min}$ or $T_{mid}$ (if any). The range is tested 110 for whether it is greater than the range factor. If it is not (112), the determinations in this aspect of the program are completed 114. If the range is too big, a further run time $T_{mid2}$ is set 116 as the mid-point in the maximum list between $T_{max}$ and the greater of $T_{min}$ or $T_{mid}$ (if any), rounded down into the allowed list. (There is no $T_{mid2}$ in the example of Table I.) Although no further middle times should be necessary in the present circumstance, such may be necessary in other cases such as with a smaller range factor. The actual group run times thus consist of $T_{max}$, $T_{mid2}$ (if any), $T_{mid}$ (if any) and $T_{min}$.

There additionally may be a specific test to provide only one group if the ratio of the highest to the lowest of the maximum exposure times is less than the range factor. In this case the run time is the lowest maximum time rounded down into the allowed list.

Figure 6:
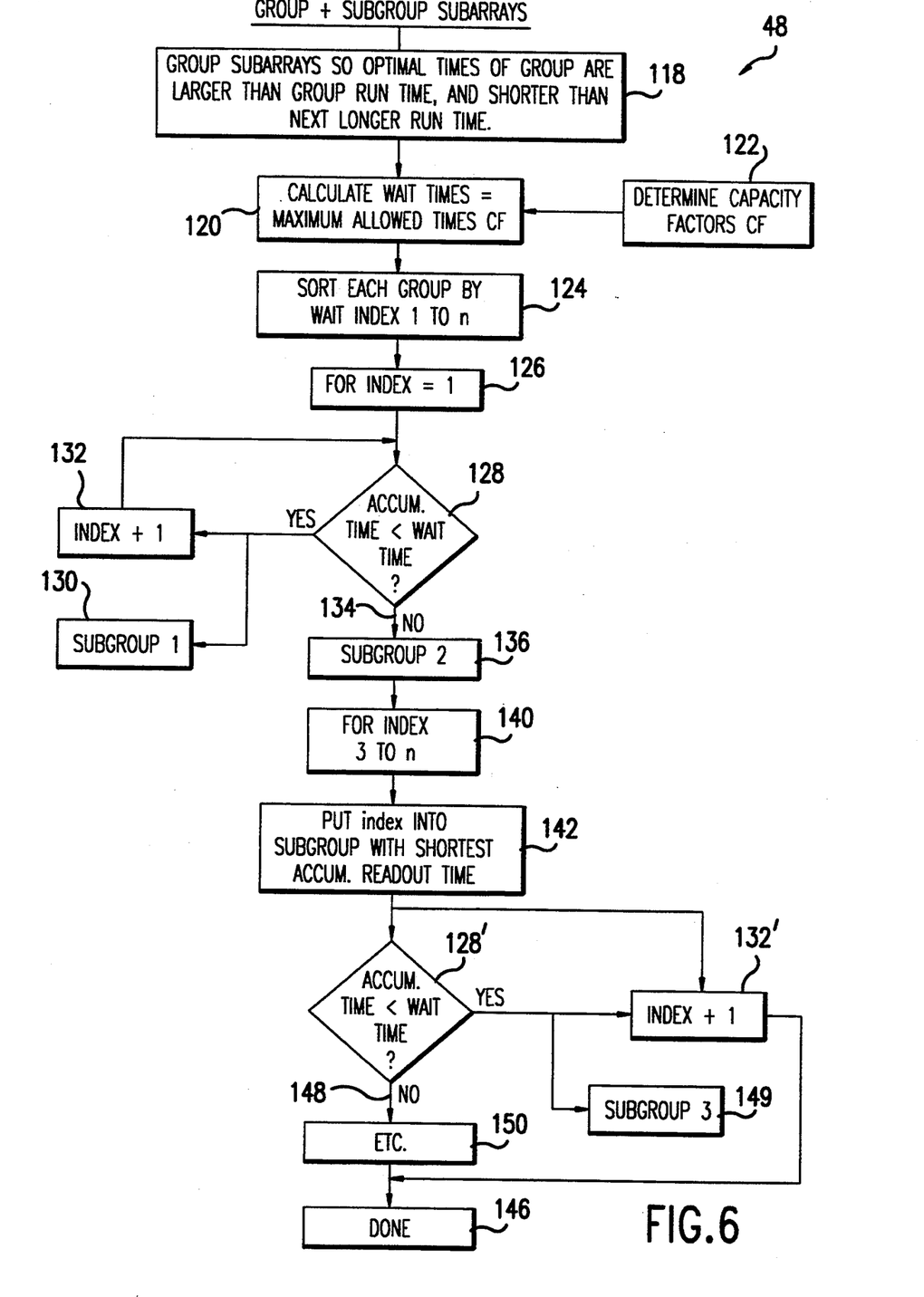

Grouping and subgrouping is effected next (48, FIG. 6). The subarrays, and corresponding selected wavelengths, are assigned 118 into the run time groups. All subarrays with maximum exposure times greater than $T_{max}$ are assigned thereto. All further subarrays with maximum exposure times greater than $T_{mid2}$ (if any) are assigned thereto. All then-further subarrays with maximum exposure times greater than $T_{mid}$ (if any) are assigned thereto. All remaining subarrays are assigned to $T_{min}$. More generally, after assignment to $T_{max}$, all remaining subarrays are assigned so that all optinal exposure times for each group are longer than the group run time and shorter than a next longer group run time.

It is possible to procede with actual runs at this stage. However, further testing for possible subgrouping is desirable, particularly for the shortest time group ($T_{min}$), to account for possible contamination of readout data from charges resulting from continuing exposure of the sensor to the radiation. At the end of a run time each pixel is read out, a process that is effected during a finite readout time. Meanwhile additional charges are being collected in the pixel due to continuing exposure to the radiation. It is necessary that the readout time be completed before the total of the additional charges approaches a level where spillover occurs into the readout register, which would result in contamination of the readout data. Therefore, a requirement is set for readouts to be completed in a time before spillover ocurrs. In the LORES mode, the spillover level for the present purpose is the same as the saturation level originally used for determining maximum exposure times. Thus readout completion time for the LORES mode should be less than a wait time that is preferably the same as the effective maximum exposure time determined from the preliminary data. Since readouts are effected sequentially for a group, the actual requirement applied to each pixel in a group is for the accumulated readout time (of all readouts prior to and including that pixel) to be less than the maximum exposure time for the pixel.

In the case of the HIRES mode, a gate is raised (electronically) between the radiation collection register and the adjacent storage register at the end of the run time. The capacity of the radiation register is less than half of the storage register used during a run, so spillover can occur during readout in less than half of the ordinary saturation time. Therefore, a fractional capacity factor is applied to appropriately reduce the maximum exposure time for the comparison. The factor is the ratio of the capacities of the respective storage registers used during run times and readout. In the present example of a chip with HIRES, the capacity factor is 0.4. For the LORES mode the factor is one (1), as the registers are the same. The factor is conveniently multiplied by the maximum times to establish a "wait time" for each pixel and associated wavelength. The accumulated readout times are then tested against the wait times.

More generally, the spillover point may be determined 120 by any suitable means, for example by directly testing the pixels for spillover in the same manner as would conventionally be used to determine saturation during data runs. Preferably the wait time is established by a predetermined level (PL) that is a selected fraction of the spillover level for each type of pixel or mode, i.e. by multiplying each spillover level by the fraction. Advantageously this fraction is the same as the optimal fraction used for determining the maximum amount of the time-integrated radiation from the saturation limit. Although calculation of wait time ($T_w$) is conveniently effected as described above, more broadly it is calculated from a formula $T_w = T_i * PL/PD$, where $T_i$ and PD have same meaning as for the $T_m$ calculation.

An example is set forth in Table II (with different data than Table I) which is for a 5 ms "actual time" group. Column 1 illustrates spectral line designations, and column 2 shows assigned subarray numbers. Column 3 indicates the high resolution (HIRES) or low resolution (LORES) mode. Column 4 gives the capacity factor associated with each resolution mode, reflecting the lower spillover level for HIRES. Column 5 lists maximum exposure times determined for the selected subarrays.

Column 6 lists readout times for the subarrays. These readout times are functions of the detector and depend on the resolution mode and the number of pixels in the subarray. The readout times are relevant with respect to accumulated readout times ($T_{acr}$) with successive readouts.

A "wait time" ($T_w$) (Column 7) is computed for each selected subarray as the multiplication product of the capacity factor (column 4) and the maximum time (column 5). (In the program it is convenient to make these computations when maximum times are computed.) Index numbers (column 8) are assigned for successively increasing wait times.

A sorting routine is carried out with the wait times and the accumulated readout times so as to ensure that the latter are shorter than the wait times. Tables IIIa–IIIc illustrate the sorting of the data from Table II. Successive tests are effected in order of index number, for whether $T_{acr}$ is less than $T_w$; if so, the subarray is assigned into the tested subgroup. This is acceptable for the index 1 subarray assigment into subgroup 1 of Table IIIa. The next index 2 accumulated with index 1 in subgroup 1 has a $T_{acr}$ of 3.2 which is greater than $T_{wait}$ of 2.6. Therefore, index 2 fails in subgroup 1 and is assigned to a new subgroup 2 (Table IIIb).

Index 3 is tested in subgroup 1 (Table IIIb) and also fails; it further fails in subgroup 2 and, therefore, index 3 is assigned to new subgroup 3 (Table IIIc). Each progressive index number may be tested similarly in the until an acceptable place is found. Table IIIc shows the final sorting into three subgroups after further testing of all of the subarray data in the group.

FIG. 6 includes a flow diagram illustrating this phase. Lists are made 118 of maximum exposure times for a group and the readout times for corresponding wavelengths (or associated subarrays). Wait times are calculated 120 from the maximum times 118 and predetermined sensor capacity factor (122). Index numbers are assigned 124 to successively increasing wait times.

For index 1 (226), its readout time is tested 128 for whether less than the corresponding wait time. If yes, the wavelength is assigned 130 to the first subgroup and the next index 132 is tested 128. Successive indexes are similarly tested and, if all pass, no further subgroups are needed (i.e. no subgroup at all). If any fail 134, a second subgroup is established 136 for the failed index. Further indexes are selected 140, and are tentatively put 142 into the subgroup producing the shortest accumulated readout time, tested therein 128' and retained 146 therein if passed. If any fail 148, a third subgroup is assigned 149 and the procedures are repeated 150, with further subgroups as necessary, until indexed testing is completed 146.

All groups ($T_{mid}$, $T_{max}$, etc.) may be tested, but only the $T_{min}$ group may be expected to exceed the accumulated readout times, so testing may be limited to that group. The subgroups are run separately, but each is run for the previously determined run time (5 ms in the present example) for the group from which the subgroups are derived.

The subgrouping procedure is preferably used to supplement the basic grouping as described. However, this procedure may be quite useful per se, for example where initial grouping and time settings are selected in a manual mode without the detailed grouping procedures set forth herein.

The step 50 of determining number of runs (FIG. 3) is effected at this point. A computor formula for this is: Number of runs=Integer portion [(MinDCT)/(Run time)+0.999999]

With the listings 52 of the groupings effected as set forth above, and subgroupings as desired or required, the spectrometer is then operated 54 again on the same, or substantially the same radiation source as for the initial run, e.g. with the same sample 29 injected again into the plasma 27 (FIG. 1). A run is made for each group and subgroup for the computed group run time to generate functional data representative of time-integrated intensity providing, as desired, quantitative measurements of chemical species. Such data are obtained simultaneously for the selected bands associated with each group, and are obtained for equal times within each group. The runs are repeated according to the computed number of repetitions to be made.

The foregoing description is applicable to a spectrophotometer with a single, fixed entrance slit for the radiation from the source. It also is practical to use the concepts with a slit that is displaced laterally for separate runs, for example by a half slit width, to fill in spectral locations for a line on the sensing pixels. For example two, four or other number of slit locations may be used. In such case the foregoing operations and computations will be modified as appropriate by the number of slit locations N, viz. two, four or otherwise. For example, the intial and further operations of the spectrophotomer, and associated steps, should be repeated for each additional slit location; $T_{max}$ will be tested against MaxDCT/N; and the number of runs will be computed from run time multiplied by N. Further adjustments to the programming with N can be readily detected and entered.

The runs for each group are preferably effected simultaneously to take advantage of the groupings and run time computations. It is incidental to the invention whether the groups are run separately from each other, such operations being a function of instrument and its programming capabilities. Desirably overlap of group runs will further speed data collection.

Simultaneous data collections within each group ensure that accurate comparisons of data are achieved. The procedures also provide an extended virtual dynamic range for the detector up to 7 or 8 orders of magnitude, while retaining suitable signal-to-noise ratios and preventing pixel saturation spillover and read-out contamination. Virtually the only compromises are the distribution of the data into several groups, and runs at less than the maximum times. However, the advantages more than compensate.

While the invention has been described above in detail with reference to specific embodiments, various changes and modifications which fall within the spirit of the invention and scope of the appended claims will become apparent to those skilled in this art. Therefore, the invention is intended only to be limited by the appended claims or their equivalents.

TABLE I

| Allowed Run Times (ms) | Maximum Run Times (ms) | Group Run Times (ms) |
|---|---|---|
| 50000 | 15000 | |
| 20000 | 3000 | |
| 10000 | 2500 | 1000 |
| 5000 | 850 | |
| 2000 | 700 | |

TABLE I-continued

| Allowed Run Times (ms) | Maximum Run Times (ms) | Group Run Times (ms) |
|---|---|---|
| 1000 | 410 | |
| 500 | 165 | |
| 200 | 90 | |
| 100 | 87 | |
| 50 | 78 | |
| 20 | 62 | 50 |
| 10 | 14 | |
| 5 | 6 | 5 |
| 2 | | |
| 1 | | |

TABLE II

| 1 Element | 2 Array # | 3 Res Mode | 4 Capac Factor | 5 Maximum Times (ms) | 6 Read Times (ms) | 7 Wait Times (ms) | 8 Index # |
|---|---|---|---|---|---|---|---|
| Mg279 | 101 | L | 1 | 7.4 | 1 | 7.4 | 11 |
| Mg279.5 | 103 | L | 1 | 6 | 1.5 | 6 | 9 |
| Zu334 | 167 | L | 1 | 5.9 | 1 | 5.9 | 8 |
| Sc357 | 186 | L | 1 | 5.5 | 1 | 5.5 | 7 |
| Sc361 | 196 | L | 1 | 5.2 | 1 | 5.2 | 6 |
| Sc424 | 200 | H | 0.4 | 10 | 1.2 | 4 | 5 |
| Ar420 | 208 | H | 0.4 | 18.2 | 2 | 7.28 | 10 |
| U408 | 217 | H | 0.4 | 8 | 3 | 3.2 | 3 |
| Sr407 | 216 | H | 0.4 | 5.5 | 1.2 | 2.2 | 1 |
| K404 | 225 | H | 0.4 | 6.5 | 2 | 2.6 | 2 |
| La379 | 245 | H | 0.4 | 8.5 | 1.5 | 3.4 | 4 |

TABLE IIIa

| Index # | Array # | Read Times | Accum Read Times | | Wait Times | Comment |
|---|---|---|---|---|---|---|
| 1 | 225 | 1.2 | 1.2 | < | 2.2 | OK |
| 2 | 225 | 2.0 | 3.2 | > | 2.6 | NOT OK |

TABLE IIIb

| Index # | Array # | Read Times | Accum Read Times | | Wait Times | Comment |
|---|---|---|---|---|---|---|
| GROUP 1 | | | | | | |
| 1 | 216 | 1.2 | 1.2 | < | 2.2 | OK |
| 3 | 217 | 3.0 | 4.2 | > | 3.2 | NOT OK |
| GROUP 2 | | | | | | |
| 2 | 225 | 2.0 | 2.0 | < | 2.6 | OK |
| 3 | 217 | 3.0 | 5.0 | > | 3.2 | NOT OK |

TABLE IIIc

| Index # | Array # | Accum Read Times | Wait Times | Comment |
|---|---|---|---|---|
| SUB GROUP 1 | | | | |
| 1 | 216 | 1.2 | 2.2 | OK |
| 4 | 245 | 2.7 | 3.4 | OK |
| 6 | 196 | 3.7 | 5.2 | OK |
| 9 | 103 | 5.2 | 6 | OK |
| SUB GROUP 2 | | | | |
| 2 | 225 | 2 | 2.6 | OK |
| 5 | 200 | 3.2 | 4 | OK |
| 8 | 167 | 4.2 | 5.9 | OK |
| 11 | 101 | 5.2 | 7.4 | OK |
| SUB GROUP 3 | | | | |
| 3 | 217 | 3 | 3.2 | OK |
| 7 | 186 | 4 | 5.5 | OK |
| 10 | 208 | 6 | 7.28 | OK |

We claim:

1. A method of grouping spectral bands for data acquisition in a spectrophotometer that includes a detector with a plurality of zoned sensors receptive of time-integrated radiation representative of spectral intensities in selected spectral bands associated with corresponding sensors, the method comprising the steps of:

predetermining a maximum amount of time-integrated radiation permitted for each corresponding sensor;

initially operating the spectrophotometer on a selected radiation source for a predetermined initial time sufficient for the sensors to collect time-integrated radiation so as to generate preliminary data representative of time-integrated radiation for all of the selected bands;

establishing from the preliminary data maximum exposure times permitted for corresponding sensors, so that each maximum exposure time effects the maximum amount of time-integrated radiation for the corresponding sensor;

grouping the maximum exposure times for the sensors into at least one group, each group including a highest maximum exposure time and a lowest maximum exposure time, wherein a ratio of the highest to the lowest is equal to or less than a predetermined range factor;

establishing a group run time for each group equal to or nominally less than the lowest maximum exposure time in the group; and further operating the spectrophotometer on a radiation source substantially the same as the selected radiation source, by operating on each group for the group run time to generate functional data representative of spectral intensities for associated spectral bands.

2. The method of claim 1 wherein the detector is a solid-state photodetector comprising a two-dimensional array of the zoned sensors on a front surface.

3. The method of claim 2 wherein the sensors are positioned at spaced projection locations on the surface so as to be receptive of selected spectral lines.

4. The method of claim 3 wherein the detector is a charge coupled device.

5. The method of claim 1 wherein the step of establishing comprises calculating the maximum exposure time $T_M$ for each corresponding sensor according to a formula $T_M = T_i * MA/PD$, where $T_i$ is the initial time, MA is the maximum amount of the time-integrated radiation for the corresponding sensor, and PD is the preliminary data for the corresponding sensor.

6. The method of claim 1 wherein the sensors further have a saturation limit of time-integrated radiation, and the method further comprises determining the maximum amount of the time-integrated radiation by determining an optimal fraction of the saturation limit, and multiplying the saturation limit for each sensor by the optimal fraction, the optimal fraction being the same for all sensors.

7. The method of claim 6 wherein the initial time is sufficient for the sensors to collect time-integrated radiation generally between a minimum operational limit and the saturation limit.

8. The method of claim 1 wherein the functional data is obtained simultaneously for the spectral bands associated with each group.

9. The method of claim 1 wherein the range factor is 100.

10. The method of claim 1 wherein the maximum exposure times for all groups include an overall highest exposure time and an overall lowest maximum exposure time, and the step of establishing each group run time comprises calculating a subfactor as being a selected fraction of the range factor, establishing a maximum group run time as being nominally equal to the highest exposure time divided by the subfactor, and establishing a minimum group run time as being equal to or nominally less than the lowest exposure time, and the step of grouping comprises assigning the selected spectral bands to group run times, by assigning all such bands with maximum exposure times greater than the maximum group run time thereto, and assigning remaining such bands to the minimum group run time.

11. The method of claim 10 wherein the step of establishing each group run time further comprises installing a predetermined list of allowed group run times, equating the maximum group run time to an allowed group run time that is nominally equal to the highest exposure time divided by the subfactor, and equating the minimum group run time to an allowed group run time that is next smaller than the lowest exposure time.

12. The method of claim 11 wherein each allowed group run time above a smallest such time is approximately a factor of two larger than said group next smaller such time.

13. The method of claim 12 wherein the range factor is 100.

14. The method of claim 10 wherein the step of establishing each group run time further comprises selecting at least one further group run time between the maximum group run time and the minimum group run time so that each ratio of each group run time to a next shorter group run time is less than the range factor, and the step of grouping further comprises assigning all remaining such bands so that all maximum exposure times for a group are longer than the group run time and shorter than a next larger group run time.

15. The method of claim 14 wherein the step of establishing each group run time further comprises installing a predetermined list of allowed group run times, equating the maximum group run time to an allowed group run time that is nominally equal to the highest exposure time divided by the subfactor, equating the minimum group run time to an allowed group run time that is next smaller than the lowest exposure time, and equating each further group run time to another allowed group run time.

16. The method of claim 1 wherein each sensor is operable by storage of radiation-induced charges during the group run time, and by subsequent readout of the charges during a readout time characteristic of the sensor, with storage of further such charges occurring during the readout time such that spillover of the further charges occurs after a spillover level characteristic of the sensor is reached, and the method further comprises, prior to the step of further operating, and for the selected spectral bands in a selected group:

establishing wait times for corresponding sensors from the preliminary data, so that an exposure from the selected source for each wait time effects a predetermined level of the time-integrated radiation that is less than the spillover level;

ordering the selected spectral bands of the group into at least one subgroup such that each successive spectral band in each subgroup has an accumulated readout time from all preceding spectral bands in the subgroup, the accumulated readout time being less than the wait time for the spectral band; and effecting the step of further operating the spectrophotometer for the selected group by operating the spectrometer for each subgroup so as to expose associated sensors simultaneously for the group run time and, while continuing such exposure, to immediately read out the associated sensors sequentially according to the ordering of the spectral bands in the subgroup, to thereby generate associated functional data.

17. The method of claim 16 wherein the sensors further have a saturation limit of time-integrated radiation, and the method further comprises determining the maximum amount of the time-integrated radiation by determining an optimal fraction of the saturation limit, and multiplying the saturation limit for each sensor by the optimal fraction, the optimal fraction being the same for all sensors, such that the predetermined level for each sensor equals the spillover level for the sensor multiplied by the optimal fraction.

18. The method of claim 16 wherein the step of establishing wait times comprises calculating each wait time $T_w$ according to a formula $T_w = T_i * PL/PD$, where $T_i$ is the initial time, PL is a predetermined level of the time-integrated radiation for the corresponding sensor less than the spillover level, and PD is the preliminary data for the corresponding sensor.

19. A method of grouping spectral bands for data acquisition in a spectrophotometer that includes a detector with a plurality of zoned sensors receptive of time-integrated radiation representative of spectral intensities in selected spectral bands associated with corresponding sensors, each sensor being operable by storage of radiation-induced charges during a run time, and by subsequent readout of the charges during a readout time characteristic of the sensor, with storage of further such charges occurring during the readout time such that spillover of the further charges occurs after a spillover level characteristic of the sensor is reached, the method comprising:

initially operating the spectrophotometer on a selected radiation source for a predetermined initial time sufficient for the sensors to collect time-integrated radiation so as to generate preliminary data representative of time-integrated radiation for all of the selected bands;

establishing wait times for corresponding sensors from the preliminary data, so that an exposure from the selected source for each wait time effects a predetermined level of the time-integrated radiation that is less than the spillover level;

ordering the selected spectral bands into at least one group such that each successive spectral band in each group has an accumulated readout time from all preceding spectral bands in the group, the accumulated readout time being less than the wait time for the spectral band; and further operating the spectrophotometer on a radiation source substantially the same as the selected radiation source, so as to expose the selected sensors simultaneously for a selected run time for each group and, while continuing such exposure, to immediately read out the associated sensors sequentially according to the ordering of the selected spectral bands in the group, to thereby generate functional data representative of spectral intensities for associated spectral bands.

20. The method of claim 19 wherein the predetermined level for each sensor equals the spillover level for the sensor multiplied by a predetermined optimal fraction of the spillover level, the optimal fraction being the same for all sensors.

21. The method of claim 19 wherein the step of establishing wait times comprises calculating each wait time $T_w$ according to a formula $T_w = T_i * PL/PD$, where $T_i$ is the initial time, PL is a predetermined level of the time-integrated radiation for the corresponding sensor less than the spillover level, and PD is the preliminary data for the corresponding sensor.

22. The method of claim 19 wherein the detector is a solid-state photodetector comprising a two-dimensional array of the zoned sensors on a front surface.

23. The method of claim 22 wherein the sensors are positioned at projection locations on the surface so as to be receptive of selected spectral lines, the sensors constituting substantially less than the surface.

24. The method of claim 23 wherein the detector is a charge coupled device.

25. A spectrometric apparatus comprising a spectral dispersion system receptive of radiation for effecting spectral bands therefrom, a detector with a plurality of zoned sensors receptive of time-integrated radiation representative of spectral intensities in selected spectral bands associated with corresponding sensors, a data station receptive of signal data from the detector representative of the time-integrated radiation, and program means in the data station for grouping the selected spectral bands for data acquisition, the program means including stored predetermined maximum amounts of the time-integrated radiation permitted for each corresponding sensor, wherein:

the apparatus further comprises means for initially operating the spectrophotometer for a predetermined initial time sufficient for the sensors to collect time-integrated radiation so as to generate preliminary data representative of time-integrated radiation for all of the selected bands;

the program means comprises:

means for establishing from the preliminary data maximum exposure times permitted for corresponding sensors, so that each maximum exposure time effects the maximum amount of time-integrated radiation for the corresponding sensor;

means for grouping the maximum exposures for the sensors into at least one group, each group including a highest maximum exposure time and a lowest maximum exposure time, wherein a ratio of the highest to the lowest is equal to or less than a predetermined range factor; and means for establishing a group run time for each group equal to or nominally less than the lowest maximum exposure time in the group; and the apparatus further comprises means for further operating the spectrophotometer on each group for the group run time to generate functional data representative of spectral intensities for associated spectral bands.

26. The apparatus of claim 25 wherein the detector is a solid-state photodetector comprising a two-dimensional array of the zoned sensors on a front surface.

27. The apparatus of claim 26 wherein the sensors are positioned at projection locations on the surface so as to be receptive of selected spectral lines, the sensors constituting substantially less than the surface.

28. The apparatus of claim 27 wherein the detector is a charge coupled device.

29. The apparatus of claim 25 wherein the means for establishing comprises means for calculating the maximum exposure time $T_M$ for each corresponding sensor according to a formula $T_M = T_i * MA/PD$, where $T_i$ is the initial time, MA is the maximum amount of the time-integrated radiation for the corresponding sensor, and PD is the preliminary data for the corresponding sensor.

30. The apparatus of claim 25 wherein the functional data is obtained simultaneously for the spectral bands associated with each group.

31. The apparatus of claim 25 wherein the maximum exposure times for all groups include an overall highest exposure time and an overall lowest maximum exposure time, and the means for establishing each group run time comprises means for calculating a subfactor as being a selected fraction of the range factor, means for establishing a maximum group run time as being nominally equal to the highest exposure time divided by the subfactor, and means for establishing a minimum group run time as being equal to or nominally less than the lowest exposure time, and the means for grouping comprises means for assigning the selected spectral bands to group run times, by assigning all such bands with maximum exposure times greater than the maximum group run time thereto, and assigning remaining such bands to the minimum group run time.

32. The apparatus of claim 31 wherein the means for establishing each group run time further comprises means for installing a predetermined list of allowed group run times, means for equating the maximum group run time to an allowed group run time that is nominally equal to the highest exposure time divided by the subfactor, and means for equating the minimum group run time to an allowed group run time that is next smaller than the lowest exposure time.

33. The apparatus of claim 31 wherein each allowed group run time above a smallest such time is approximately a factor of two larger than a next smaller such time.

34. The apparatus of claim 31 wherein the means for establishing each group run time further comprises means for selecting at least one further group run time between the maximum group run time and the minimum group run time so that each ratio of each group run time to a next shorter group run time is less than the range factor, and the means for grouping further comprises means for assigning all remaining such bands so that all maximum exposure times for a group are longer than the group run time and shorter than a next larger group run time.

35. The apparatus of claim 34 wherein the means for establishing each group run time further comprises means for installing a predetermined list of allowed group run times, means for equating the maximum group run time to an allowed group run time that is nominally equal to the highest exposure time divided by the subfactor, means for equating the minimum group run time to an allowed group run time that is next smaller than the lowest exposure time, and means for equating each further group run time to another allowed group run time.

36. The apparatus of claim 25 wherein each sensor is operable by storage of radiation-induced charges during the group run time, and by subsequent readout of the charges during a readout time characteristic of the sensor, with storage of further such charges occuring during the readout time such that spillover of the further charges occurs after a spillover time characteristic of the sensor is reached, and wherein:

the program means further comprises, prior to further operating, and for the selected spectral bands in a selected group, means for establishing wait times for corresponding sensors from the preliminary data, so that an exposure from the selected source for each wait time effects a predetermined level of the time-integrated radiation that is less than the spillover level, and means for ordering the selected spectral bands of the group into at least one subgroup such that each successive spectral band in each subgroup has an accumulated readout time from all preceding spectral bands in the subgroup, the accumulated readout time being less than the wait time for the spectral band; and the means for further operating comprises means for operating the spectrometer for each subgroup so as to expose associated sensors simultaneously for the group run time and, while and continuing such exposure, to immediately read out the associated sensors sequentially according to the ordering of the spectral bands in the subgroup, to thereby generate associated functional data.

37. The apparatus of claim 36 wherein the sensors further have a saturation limit of time-integrated radiation, and the program means further comprises means for determining the maximum amount of the time-integrated radiation by determining an optimal fraction of the saturation limit, and means for multiplying the saturation limit for each sensor by the optimal fraction, the optimal fraction being the same for all sensors, such that the predetermined level for each sensor equals the spillover level for the sensor multiplied by the optimal fraction.

38. The apparatus of claim 36 wherein the means for establishing wait times comprises means for calculating each wait time $T_w$ according to a formula $T_w = T_i * PL/PD$, where $T_i$ is the initial time, PL is a predetermined level of the time-integrated radiation for the corresponding sensor less than the spillover level, and PD is the preliminary data for the corresponding sensor.

39. A spectrometric apparatus comprising a spectral dispersion system receptive of radiation for effecting spectral bands therefrom, a detector with a plurality of zoned sensors receptive of time-integrated radiation representative of spectral intensities in selected spectral bands associated with corresponding sensors, a data station receptive of signal data from the detector representative of the time-integrated radiation, and program means in the data station for grouping the selected spectral bands for data acquisition, each sensor being operable by storage of radiation-induced charges during the group run time, and by subsequent readout of the charges during a readout time characteristic of the sensor, with storage of further such charges occuring during the readout time such that spillover of the further charges occurs after a spillover time characteristic of the sensor, wherein:

the apparatus further comprises means for initially operating the spectrophotometer for a predetermined initial time sufficient for the sensors to collect time-integrated radiation so as to generate preliminary data representative of time-integrated radiation for all of the selected bands;

the program means comprises means for establishing wait times for corresponding sensors from the preliminary data, so that an exposure from the selected source for each wait time effects a predetermined level of the time-integrated radiation that is less than the spillover level, and means for ordering the selected spectral bands into at least one group such that each successive spectral band in each group has an accumulated readout time from all preceding spectral bands in the group, the accumulated readout time being less than the wait time for the spectral band; and the apparatus further comprises means for operating the spectrometer for a selected run time for each group so as to expose the selected sensors simultaneously for the selected run time for each group and, while continuing such exposure, to immediately read out the associated sensors sequentially according to the ordering of the spectral bands in the group, to thereby generate functional data representative of spectral intensities for associated spectral bands.

40. The apparatus of claim 39 wherein the predetermined level for each sensor equals the spillover level for the sensor multiplied by a predetermined optimal fraction of the spillover level, the optimal fraction being the same for all sensors.

41. The apparatus of claim 39 wherein the means for establishing wait times comprises means for calculating each wait time $T_w$ according to a formula $T_w = T_i * PL/PD$, where $T_i$ is the initial time, PL is a predetermined level of the time-integrated radiation for the corresponding sensor less than the spillover level, and PD is the preliminary data for the corresponding sensor.

42. The apparatus of claim 39 wherein the detector is a solid-state photodetector comprising a two-dimensional array of the zoned sensors on a front surface.

43. The apparatus of claim 42 wherein the sensors are positioned at projection locations on the surface so as to be receptive of selected spectral lines, the sensors constituting substantially less than the surface.

44. The apparatus of claim 43 wherein the detector is a charge coupled device.

* * * * *